United States Patent [19]

Fahrenholz

[11] 4,315,546

[45] Feb. 16, 1982

[54] DOUBLE ROLL ROCK WINDROWER

[76] Inventor: Harley D. Fahrenholz, Clarissa, Minn.

[21] Appl. No.: 146,671

[22] Filed: May 5, 1980

[51] Int. Cl.$^3$ ............................................. A01G 43/00
[52] U.S. Cl. ..................................................... 171/65
[58] Field of Search ...................... 171/63, 64, 65, 89; 56/377, 328 R, DIG. 21

[56] References Cited

U.S. PATENT DOCUMENTS

| | | | |
|---|---|---|---|
| 2,938,586 | 5/1960 | Gaffney | 56/377 |
| 3,117,631 | 1/1964 | Fahrenholz | 171/63 |
| 3,739,855 | 6/1973 | Bliss | 171/63 |
| 3,993,141 | 11/1976 | Donohue | 56/328 R |

*Primary Examiner*—Robert A. Hafer

[57] ABSTRACT

A rock windrower which has a main roller that is moved along the ground and is rotationally driven under power. The roller is at an oblique angle with respect to the direction of travel, so that the rocks that are dislodged are moved axially along the roller and laterally to the direction of movement until they are discharged at the trailing end of the roll to be left in a windrow. The present device further includes an auxiliary roller mounted above the main roller to prevent rocks from spilling over the main roller, thus making it possible to form larger windrows, while permitting dirt clods and some foreign material to pass between the rollers. The auxiliary or second roller is mounted on arms that are pivotally mounted relative to the mounting for the main roller to permit the second roller to move if necessary.

4 Claims, 14 Drawing Figures

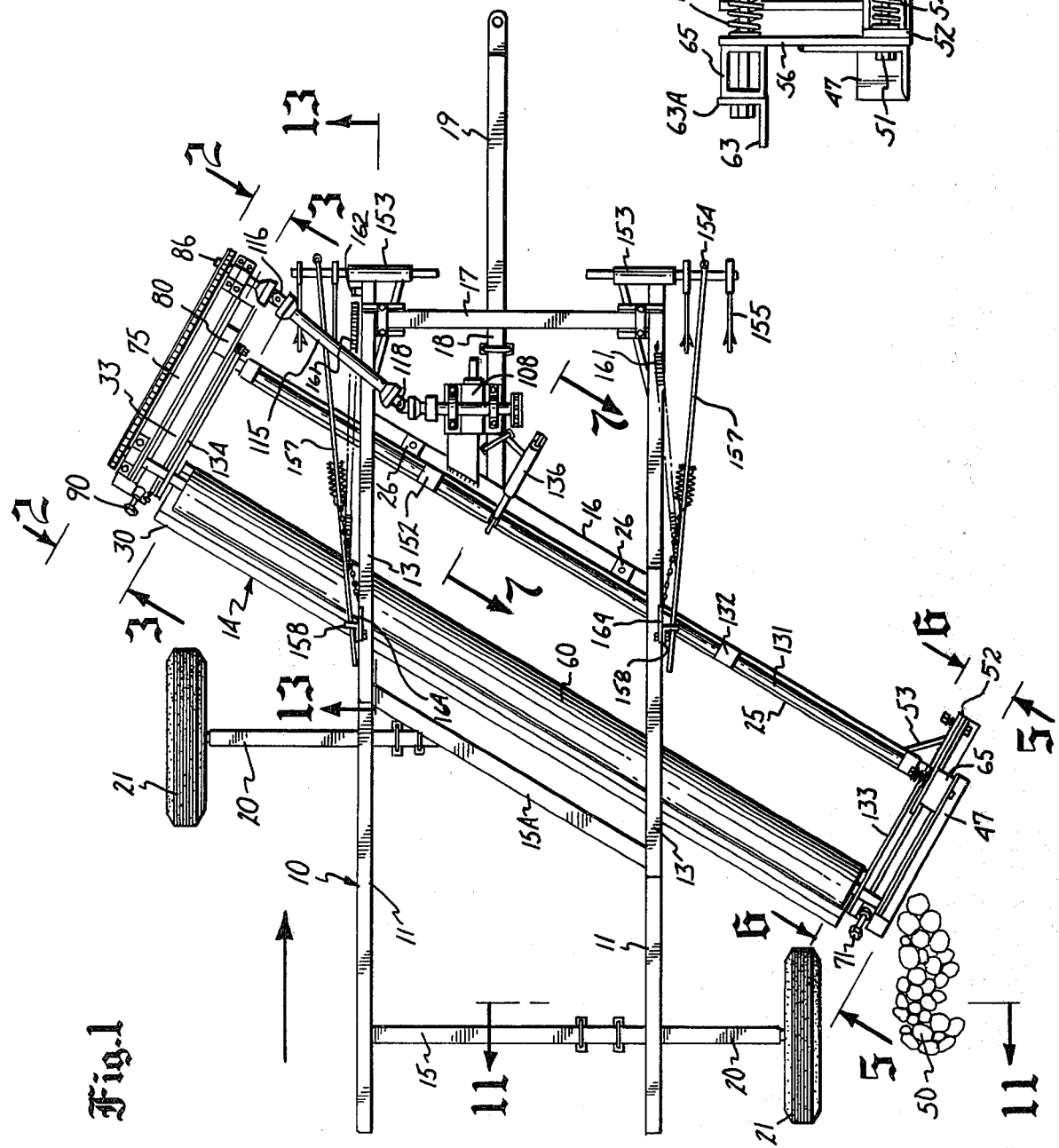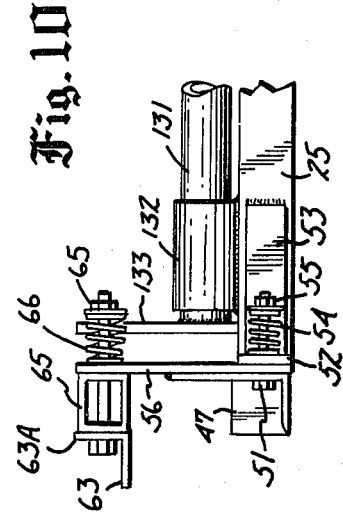

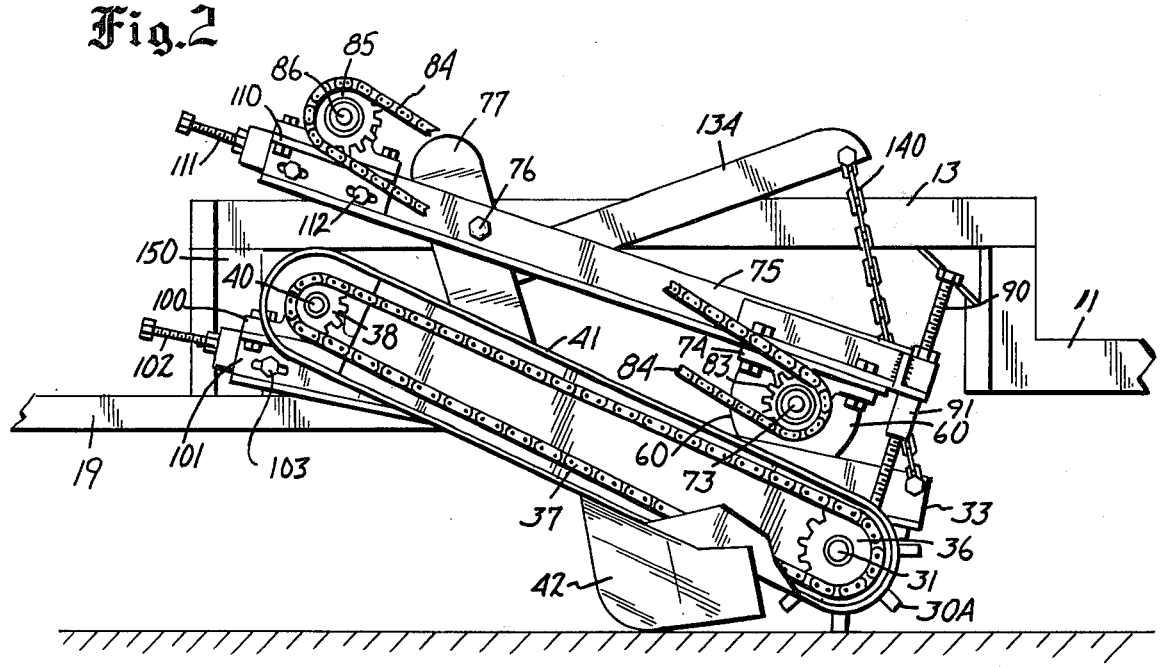
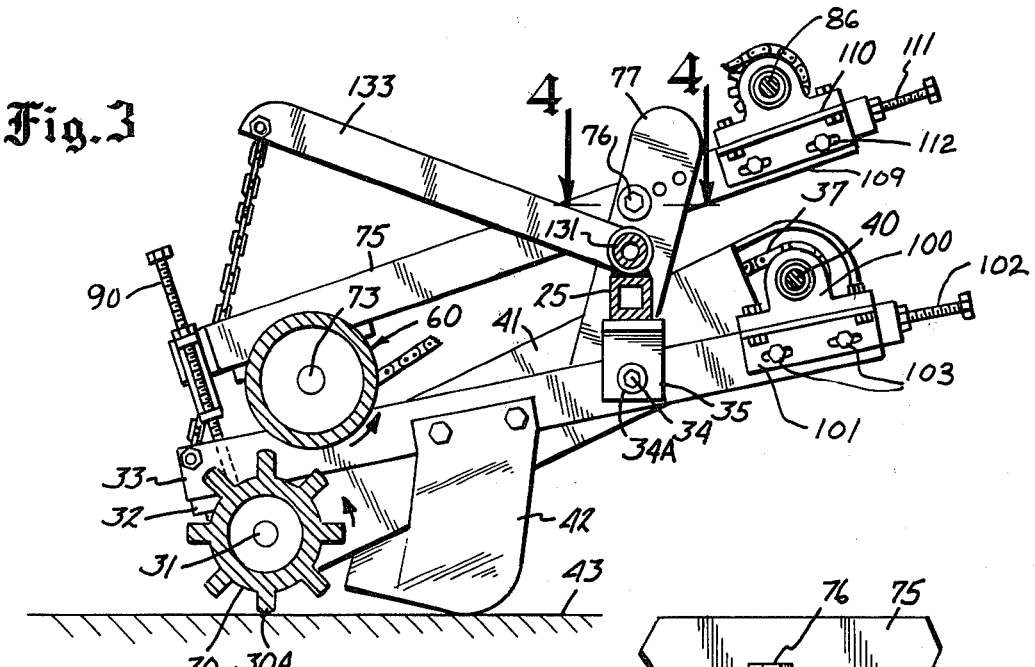
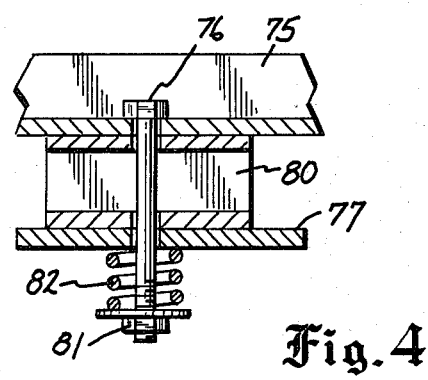

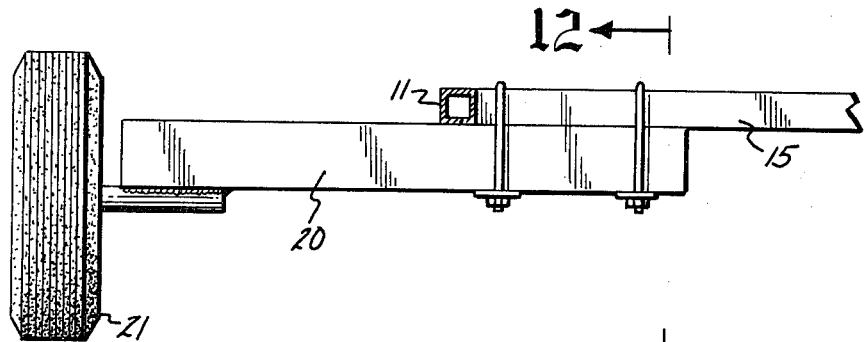
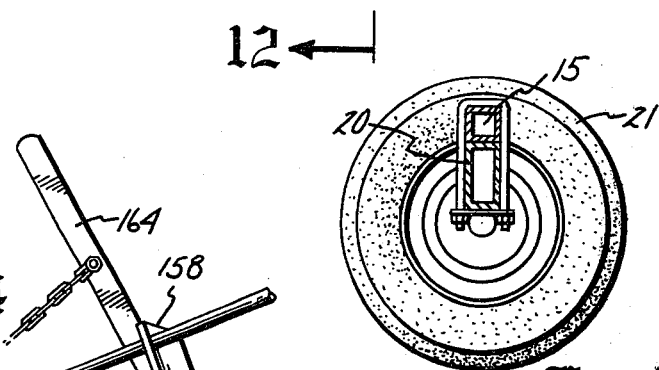
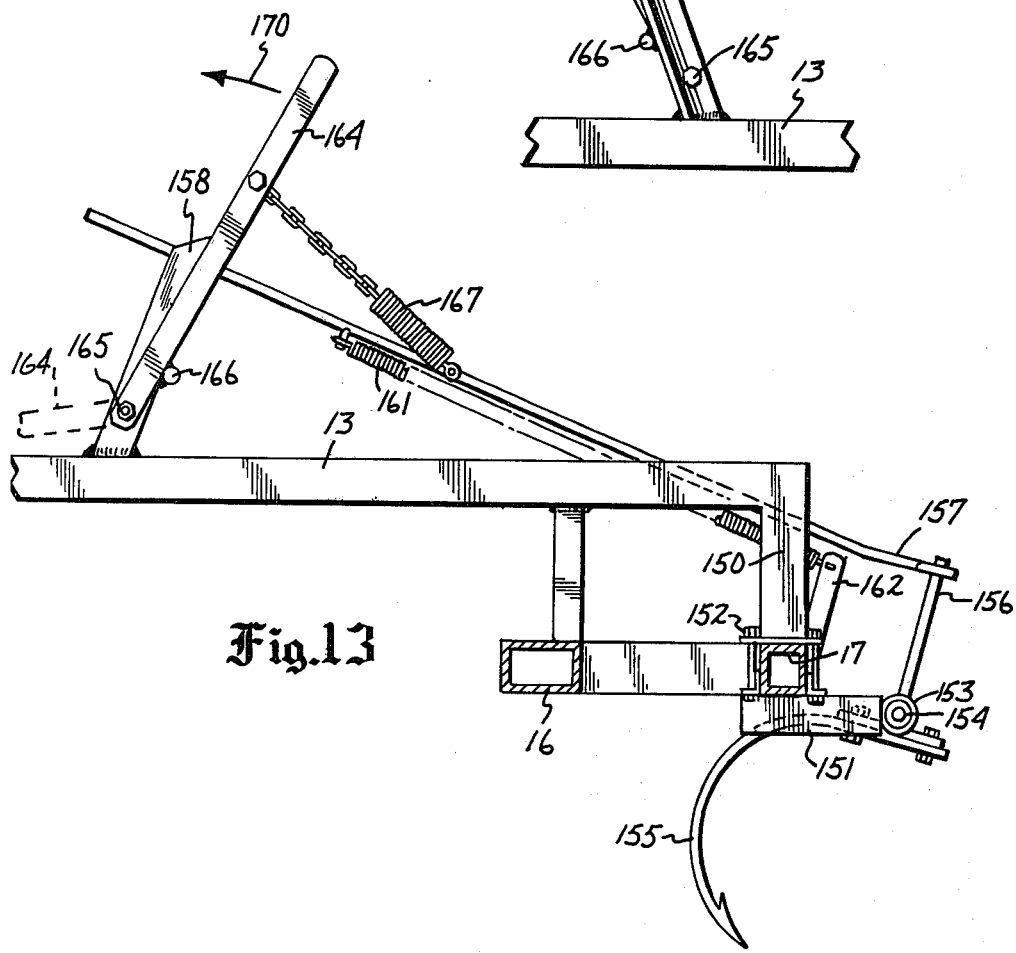

DOUBLE ROLL ROCK WINDROWER

BACKGROUND OF THE INVENTION

1. Field of the Invention

The present invention relates to improvements in rock windrowers that place rocks that are on the surface of the ground into a windrow where they can be picked up by a rock picker.

2. Prior Art

Various rock windrowers have been advanced. For example, my own U.S. Pat. No. 3,117,631 shows a windrower of the general type disclosed herein, but without the upper or auxiliary roll. The improvements permit a better job of windrowing, with less rocks spilling over the top of the main windrowing roller.

SUMMARY OF THE INVENTION

The present invention relates to a rock windrower which has a first main roller that is positioned obliquely with respect to the direction of travel and which engages or penetrates the surface of the ground to dislodge rocks on the surface of the ground. The main roller is mounted on a pair of arms that are pivotally mounted so they may be raised and lowered relative to the support frame. A second roller is mounted on arms that are pivotally mounted with respect to the arms of the first roller to permit movement of the second roller toward and away from the first roller. The second roller is positioned above the first roller and serve to prevent large rocks or objects from passing between the rollers, thereby tending to increase the efficiency of the windrower and permit larger windrows to be made.

Both of the rollers are powered and tend to kick the rocks forwardly with respect to the direction of travel. Stop means are provided to control the spacing between the rollers.

The rollers permit clods of dirt and small stones to pass between the rollers, while causing the larger rocks, which are the objectionable rocks in the field, to be formed into a windrow discharged at the trailing end of the rolls, and left on the ground where they can be picked up by a rock picker quite easily.

BRIEF DESCRIPTION OF THE DRAWINGS

FIG. 1 is a top plan view of a rock windrower made according to the present invention;

FIG. 2 is an end view taken along line 2—2 in FIG. 1;

FIG. 3 is a sectional view taken as along line 3—3 in FIG. 1;

FIG. 4 is an enlarged sectional view taken as on line 4—4 in FIG. 3;

FIG. 10 is a sectional view taken as on line 10—10 in FIG. 5;

FIG. 11 is a fragmentary front view of the rear wheel mounting taken on line 11—11 in FIG. 1;

FIG. 12 is a sectional view taken as on line 12—12 in FIG. 11;

FIG. 13 is a side sectional view of a forward portion of the frame showing a cultivator section used for loosening the dirt packed by the tires of the towing tractor; and FIG. 14 is a view of a lever mounting used for controlling the cultivator section shown in FIG. 13.

DESCRIPTION OF THE PREFERRED EMBODIMENTS

Figure 5:
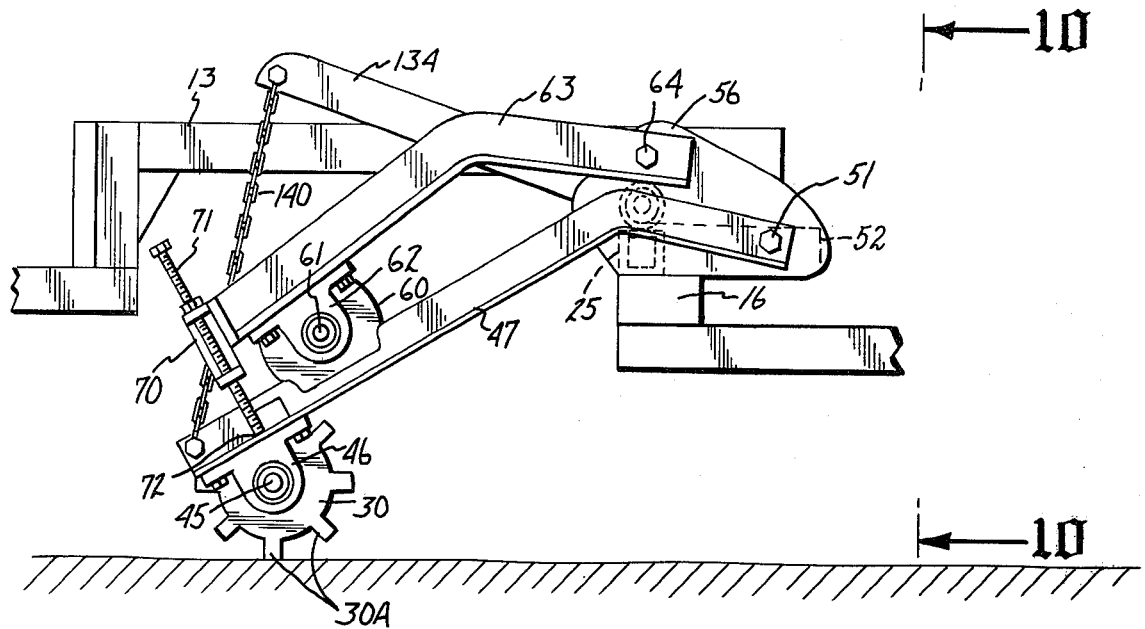
FIG. 5 is an end view of the rock windrower of the present invention taken from the opposite end of FIG. 2 and as generally along line 5—5 in FIG. 1.
Figure 6:
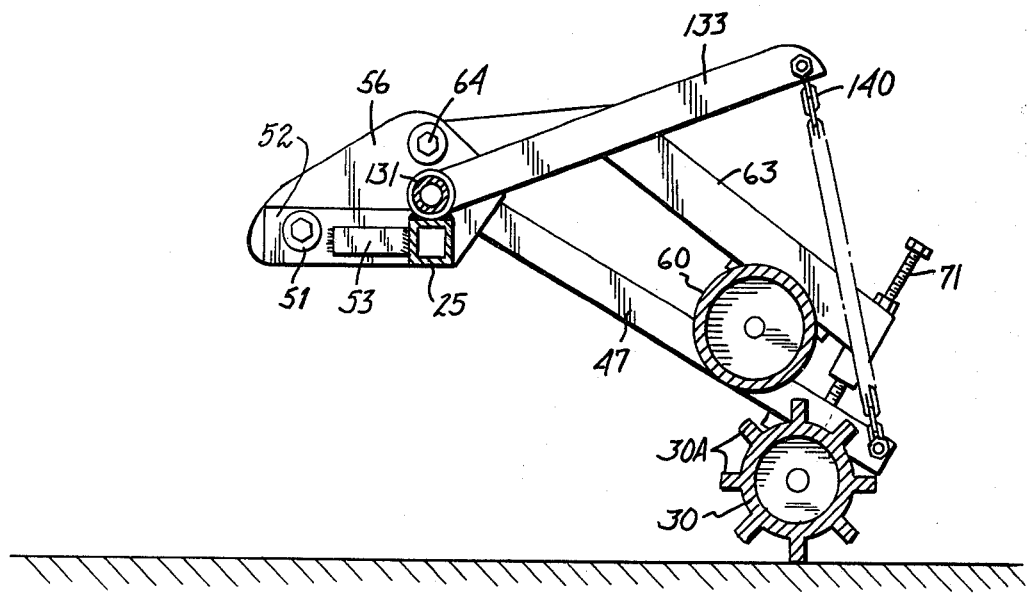
FIG. 6 is a sectional view taken along line 6—6 in FIG. 1.

Referring to FIG. 1, a frame assembly illustrated generally at 10 has a pair of longitudinally extending frame members 11. These frame members have offset bridge sections 13,13 that provide a space for the mounting of a rock windrower roll assembly illustrated generally at 14. The frame members 11 are held together with suitable cross members, for example a rear cross member 15, an intermediate cross member 15A, and a front cross member 16, which are oblique to the direction of travel, and a forward cross member 17. In addition, the cross members 16 and 17 are held together with a fore and aft extending tie frame member 18. A hitch pole 19 is connected in a suitable manner to the frame member 18 (it is positioned below the frame member) and can be attached to a prime mover (not shown).

Suitable axle supports indicated at 20 can be provided for mounting wheels 21. These axle supports can be dropped down below the frame members to achieve the desired height of the frame members 11.

The rock windrower roll assembly 14 mounts on the frame and is positioned under the bridge portion 13. If desired the roll assembly can be adjusted back and forth along the frame members. Primarily, the rock windrower roll assembly includes a main support tube or frame member 25, which extends obliquely with respect to the frame members 11, and thus with respect to the direction of movement. The frame member 25 is mounted to the cross member 16 which also is obliquely extending. Suitable bolts and brackets can be used for mounting the frame member 25. For example the bracket shown at 26 can be used. The tube 25, as can be seen for example in FIG. 3 is a square tube and extends the full length of the roller assembly. Tube 25 is used for mounting the rollers, as will be explained.

The roller assembly 14 includes a ground engaging roller 30 which has shafts at opposite ends thereof installed in a known manner. As shown shaft 31 for the leading end of the roller (see FIGS. 2 and 3) is mounted in a suitable pillow block bearing 32, which is a bearing that has a part spherical outer race to permit some self-alignment during use. The bearing 32 is mounted onto a first support arm 33. The support arm 33 is an angle iron, and it extends forwardly and upwardly as shown, and is pivotally mounted with a suitable pivot bolt 34 to a tab or bracket 35 that is attached to the bottom of the main frame tube 25. The pivot bolt 34 passes through the tab 35, and through one leg of the angle iron arm 34. The bolt 34 has a head that fits to the outside of the angle iron arm 33, and a spring shown at 34A is used for holding the arm 34 against the tab 35 but yet permitting some tilting of the arm during pivoting.

The outer end of the shaft 31 has a sprocket 36 drivably mounted thereon, and the sprocket 36 in turn is driven by a chain 37. The chain 37 is driven from a drive sprocket 38 that is connected to a drive shaft 40 adjacent the upper end of the angle iron arm 33. The chain 37 is positioned within a chain guard 41, and in addition, a dirt shield 42 extends downwardly from the arm 33 as shown in FIG. 3 to keep some of the dirt and other foreign material from the ground 43 from getting into the chain drive.

The opposite end of the roller 30 also has a shaft 45 which is mounted in a bearing 46 (see FIG. 5) that in turn is attached to an arm 47. The arm 47 extends upwardly as shown, and is positioned at a somewhat steeper angle than the arm 33. At this end of the roller 30, the windrow of rocks is discharged, so the extra clearance under the arm 47 as shown in FIG. 5 is desirable to permit rocks and debris to be discharged from the windrower. Such a rock windrow is shown at 50 in FIG. 1, and the trailing end of the roller assembly is the windrow discharge end.

The arm 47 is pivotally mounted on a pivot bolt 51 that, as can be seen in FIG. 10, passes through a support strap 52 that is welded to the end of the frame tube 25 and is braced to the tube 25 with a suitable brace 53. Pivot bolt 51 can be suitably bushed if desired, but as shown in FIG. 10, it passes through the strap 52 and tends to hold the arm 47 tight against the strap 52 through the use of a spring 54 that is adjusted in pressure with a nut 55 threaded on the pivot bolt 51.

Also it should be noted that the arm 47 includes a mounting plate 56 that is welded to the arm near the pivot bolt and moves with the arm. The plate 56 and the arm 47 move together as a unit about the pivot bolt 51. It may be noted that the axis of pivot of bolts 51 and 34 are offset somewhat, but the spring 54, and the spring 34A on the bolt 34 (the pivot bolt 34 is mounted as shown in FIG. 10 as well) to permit the arms to cock slightly as the arms 47 and 33 pivot. The raising of the pivot on the discharge end of the assembly is to provide adequate clearance, and the length of the roll make it so that a slight misalignment is taken up in the bearings, which are the self-aligning type, as well as in the pivot bolt springs. The arms 33 and 47, as will be explained, are used merely for lifting the lower roll 30 out of engagement with the ground, as well as permitting some floating of the roll, so there is not excessive wear at the pivot points.

The roller assembly 14 includes a second top roller indicated generally at 60. This roller is a smooth roll, as distinguished from the roller 30 which has a plurality of longitudinally extending ribs or teeth 30A thereon. The roller 60 is mounted at the trailing end with a shaft 61 that is attached to the roller in a suitable manner, through the use of a self-aligning pillow block bearing 62, to an arm 63. The arm 63 in turn is pivotally connected to the plate 56 that is welded to arm 47. The arm 63 is mounted to the plate 56 with a pivot bolt 64, which also is constructed as shown in FIG. 10. However, the arm 63 is spaced outwardly from the plate 56 with a suitable spacer block (as shown a square tube) and is indicated at 65. This block 65 can be welded to the plate 56 if desired, and the pivot bolt 64 passes through the spacer, through an aperture in the plate 56, and is held in place with a nut 65 acting against the spring 66 which tends to urge the one leg 63A of the arm 63, as shown in FIG. 10 against the spacer 65. This permits the roller 60 to pivot relative to the roll 30 independently of the pivoting of the roll 30 about its pivot bolt 51 and 34.

At the outer end of the arm 63 (the rear end adjacent bearing 62) there is a stop bolt bracket 70 through which a stop bolt 71 is threaded. Stop bolt 71 has suitable lock nuts on it, and it is threaded into threaded openings in the bracket 70. The end of the stop bolt 71 bears against the horizontal leg of the arm 47 that mounts the roller 30. The stop position is shown at 72 in FIG. 5. Spacing between the rollers 30 and 60 is important because it determines the amount of material that is to be passed between the rollers. The rollers will not touch during use, but will permit dirt and materials to pass between the rollers so that the rock windrow indicated generally at 50 is not excessively filled with dirt and trash.

The opposite or leading end of the roll 60 (referring now to FIGS. 1, 2, 3 and 4 primarily) has a shaft 73 thereon mounted in the roller in a suitable manner, and this shaft 73 in turn is mounted in a bearing 74 which is of the self-aligning type also. Bearing 74 is attached to the horizontal leg of an angle iron forming a pivot arm 75. The pivot arm 75 in turn is pivotally mounted with a pivot bolt 76 (FIG. 4) to a bracket or plate 77. The bracket plate 77 is welded to the arm 33, and moves with the arm 33 in much the same way that the plate 56 moves with the arm 47. Thus, the bracket mounting plate 77 moves whenever arm 33 pivots about bolt 34. The arm 75 and the pivot bolt 76 move as well. The pivot bolt 76 is shown in FIGS. 3 and 4. The arm 75 is spaced outwardly from the plate 77 with a suitable spacer block 80. The bolt 76 passes through the vertical leg of the angle iron forming arm 75, through provided openings in the spacer block 80, through the bracket 77 and is retained with a nut 81 acting against a spring 82 which again permits the arm 77 to tilt slightly relative to the plate 77 so that one end of the roll 60 can raise relative to the other if it has to move to let material pass between the rollers.

The shaft 73 has a sprocket 83 (FIG. 2) drivably mounted thereon. The sprocket 83 is driven by a chain 84 driven from a sprocket 85 which in turn is mounted onto a drive shaft 86. The drive shaft is powered, as will be explained.

The arm 75 also includes a stop assembly for spacing the rollers 60 with respect to the roller 30, and this stop assembly includes a stop bolt 90 threaded into a bracket 91. The end of the stop bolt bears against the horizontal leg of the angle iron forming arm 33. Thus the spacing of this end of the roller 60 relative to roller 30 can also be adjusted by threading the bolt 90 and using suitable lock nuts for locking the bolt in position.

As was stated, the rolls 30 and 60 were both power driven. The drive shaft 40 for the lower roll 30 is mounted in a bearing assembly 100 that is in turn mounted on a bearing support 101 that is adjustably mounted on the upper end of the arm 33. The adjustment can be made with an adjusting bolt 102 that is threaded through a portion of the bracket 101 and bears against the arm 33. Suitable clamp bolts 103 can be used for holding the bracket 101 in position on arm 33 to keep adequate tension in the chain 37 for driving the roller.

Figure 8:
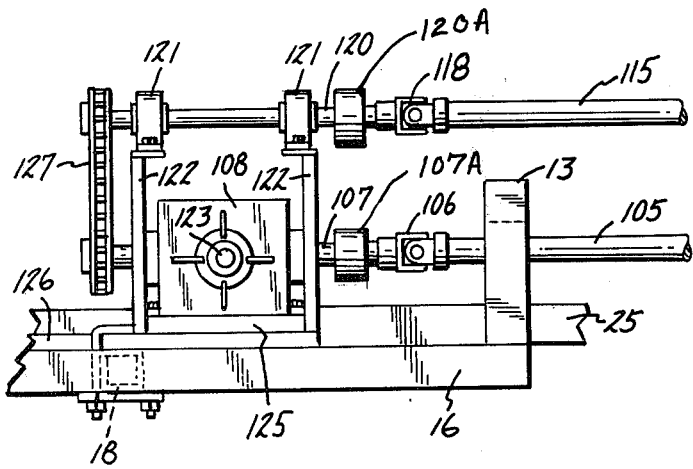
FIG. 8 is a fragmentary front view showing a gear box mounting and drive for use with the rock windrower of the present invention.
Figure 9:
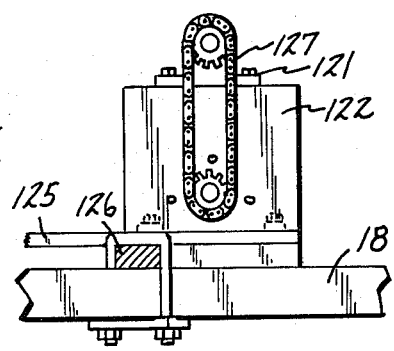
FIG. 9 is a side view of the device of FIG. 8.

The shaft 40 is driven through a telescoping shaft 105, which has universal joints at its opposite ends. One of the universal joint is connected to the shaft 40, and the other universal joint is shown in FIG. 8 at 106 and is driven from an output shaft 107 of a gear box 108 through a slip clutch 107A. Gear box 108 has an input shaft 123 which is driven from a power take off shaft of a tractor in a normal manner and forms the power means for driving both rollers.

The shaft 86 is mounted onto a bearing assembly 110 comprising a pair of bearings side by side on a bracket 109 which also is adjustable relative to the arm 75, with a suitable bolt 111 that threads into the bracket 109 and bears against the end of the arm 75. The bracket 109 has suitable slots and fastening bolts 112 to clamp the bracket 109 in place on the arm 75 once the proper tension has been placed in chain 84. The bearing mountings 110 shown in FIG. 1 is typical for mounting the shaft 40 as well.

Shaft 86 is driven through a shaft 115 that has a universal joint 116 at its outer end that attaches to the shaft 86 (shaft 105 has a similar universal joint) and which has a universal joint 118 at its inner end that is driven by a drive shaft 120 through a slip clutch 120A. The shaft 120 is a jack shaft or counter shaft that is mounted on a pair of bearings 121, which in turn are supported on suitable support plates 122 extending upwardly from the gear box support. Shaft 120 is driven through a chain 127 mounted over a sprocket or shaft 120. The chain 127 is driven by a sprocket mounted onto the opposite end of shaft 107 from the universal joint 106. Shaft 107 extends out both sides of the right angle gear box 108. Thus when the input shaft 123 of the gear box 108 is driven, the output shaft 107 is driven and shaft 120 is driven. Both the drive shafts then, namely shafts 40 and 86 are driven to rotate the rollers.

The bottom roller 30 rotates so that the lower portions of the roll are moving forwardly against the direction of movement. The upper roll 60 rotates in the same rotational direction so that the surface of the roll adjacent to the roll 30 is moving in opposite direction from the surface of the roll 30. The arrows in FIG. 3 adjacent rolls 30 and 60 show the direction of rotation of the rolls.

The gear box 108 is mounted onto a suitable plate 125 which in turn is welded to the cross tube 25 and extends forwardly therefrom. In addition, the plate 125 is supported with a brace 126 that is on the bottom of the plate 125. The brace 126 is fastened with a U bolt to the fore and aft extending frame member 18. The U bolt is placed diagonally across the intersection between the brace 126 and the member 18 and is then clamped in place. The brace 126 in turn extends laterally and supports an arm 130 which is a reaction or support arm for the lifting mechanism for lifting the rollers.

Figure 7:
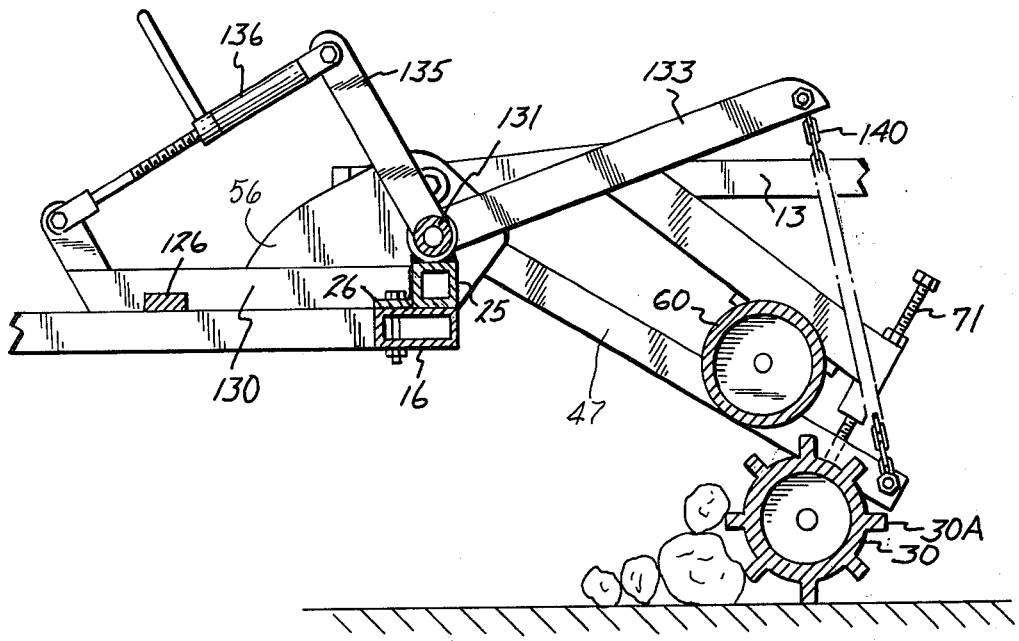
FIG. 7 is a sectional view taken along line 7—7 in FIG. 1.

Referring specifically to FIGS. 1 and 7, it can be seen that the cross frame member 25 has a rock shaft 131 mounted thereon in suitable sleeves 132. This rock shaft 131 (which is a tube or pipe) extends along the frame member 25 across substantially the entire length of the frame member.

Lift arms indicated at 133 and 134 are mounted at opposite ends of the tube or rock shaft 131. The lift arms therefore move up and down as the rock shaft 131 is rotated. Rotation of the rock shaft for lifting purposes is achieved by having an arm 135 fixedly mounted to the shaft, and a screw jack 136 is mounted between the upper end of the arm 135 and the support arm 130 as shown in FIG. 7. The screw jack 136 could be replaced by a hydraulic cylinder if desired. By changing the length of the screw jack, the rotational position of the rock shaft 131 is changed, thereby lifting or lowering the outer ends of the arms 133 and 134. Arms 133 and 134 have lift chains 140 mounted thereon, and the lift chains in turn extend down and are attached to the outer or rear ends of the supports arms 33 and 47, respectively. Thus by adjusting the screw jack 136 (or a hydraulic cylinder used in place of the screw jack 136), the arms 33 and 47 can be lifted, thereby lifting the lower roller 30 as well as the upper roller 60, which moves along with the lower arms.

The windrower includes cultivator or spring teeth that travel in the tracks of the tractor or prime mover pulling the frame. This raises rocks that are forced into or below the surface of the ground as the tractor passes over the rocks so the roller 30 can easily move the rocks into a windrow. FIGS. 1, 13 and 14 illustrate the spring teeth typically. On each side of the hitch pole 19, and at the forward end of the frame, the frame members 11 each have a depending leg 150. The legs 150 in turn support the cross member 17.

The cross member 17 as shown extends transversely between the two longitudinal beams 11 and a stub beam 151 is clamped at each end of the cross member 17 with a suitable clamp member 152 that has bolts that attach to brackets welded to the beam, and hold the beams 151 tightly against the bottom surface of the cross member 17.

At the forward ends of the beams 151 there are sleeves 153 welded. The sleeves are tubular, and have axes that extend generally horizontally and transverse to the direction of movement of the frame. A tube 154 is rotatably mounted in each of the sleeves about the longitudinal axis of the tubes. A pair of spring cultivator teeth 155 that have chisel points or suitable digging points are mounted at ends of the tubes 154 which protrude from the sleeves. The chisel points are positioned so that they will engage the ground and work the ground when lowered into position.

The tubes 154 also have upright masts 156 attached thereto, and these masts 156 are connected at their upper ends to control rods 157. At the connection between the masts 156, the control rods 157 can be an eye bolt connection that permits swiveling, or any desired type of a connection that lets the rod 157 pivot or swivel in the proper directions relative to the mast.

The rods 157 in turn extend rearwardly and are slidably guided in openings in an upright guide member 158 on each of the respective frame members 11. The upright guides 158 thus hold the rods 157 in a desired position. The rods 157 and thus the attached mast 156 and tubes 154 are connected to a spring 161 that also has one end attached to the frame. As shown in FIG. 13, the spring 161 on the beam 11 adjacent to the drive side of the rollers is mounted to a bracket 162 that extends upwardly from the member 17. This bracket 162 is to make sure that the spring clears the drive shafts that are used. On the opposite side of the machine the spring 161 can be connected to a small eye member right on the respective beam.

The springs 161 urge the rods to slide in forward direction and tend to turn the tubes 154 through the arm 156 to lift the spring teeth 155 out of the ground. This would be clockwise direction as viewed in FIG. 13.

To cause the spring teeth to be loaded into the ground, a control lever 164 is pivotally mounted as at 165 to each of the upright members 158, and as can be seen, a stop 166 is used to prevent the levers 164 from pivoting too far forwardly when they are in a raised position. By manually moving the levers rearwardly, a second adjustable spring set 167, which is selected in strength to be stronger than the spring 161, will exert a force on the rods 157 tending to slide them rearwardly at the same time the lever 164 pivots about pivot 165. The lever 164 can be pivoted all the way overcenter, so that it will latch in position when it is pivoted in direction as indicated by the arrow 170. When this is done, the springs 167, which are stronger than the spring 161, will stretch the spring 161 and will exert a spring loaded force urging the teeth 155 into the ground through the links 157 and arm 156 rotating the tube 154. Thus the levers 164 merely provide an over-center control lever for moving the spring loaded teeth into the ground into the location where the tracks for a tractor or other prime mover pulling the rock windrower would be to loosen rocks that had been packed into the ground.

Thus the rock windrower efficiency is increased by insuring that these rocks that normally may not be picked up by the roller 30 will in fact be loosened and formed into the windrow. The spring teeth can extend all the way across the width of the windrower to work (cultivate) the ground and loosen rocks and other material that is embedded. The loose ground also makes formation of the windrows easier. These spring teeth means to loosen the ground can be used across the full width.

The double roller assembly permits larger windrows to be formed. The top roller keeps rocks from spilling over the roller 30 when large windrows are formed and when the stops are properly adjusted trash and clods of dirt will pass between the rollers. Thus the window remains relatively free of trash.

The lower roller may have radial pegs mounted thereon in place of the longitudinally extending bars to loosen and move rocks along into the windrow.

The windrower also can be used for windrowing trash or most other material on the top of the ground.

The frame for the windrower may be mounted on a three point hitch or comprise a "semi-mounted" unit if desired, as well as being a pull type unit as disclosed herein.

The unit shown also can be used as a landscape rake.

What is claimed is:

1. A windrower for rocks and debris on the ground comprising:
   a frame,
   a roller assembly comprising first and second rollers having generally parallel axes;
   a pair of first arms;
   means to mount the first roller on said first arms at trailing ends of the first arms;
   means to pivotally mount said first arms to the frame to permit movement of the trailing ends of the arms and the first roller relative to the ground;
   a pair of second arms;
   means to pivotally mount the second arms to move with the first arms and being pivoted at locations spaced from the trailing ends of the first arms whereby the first and second rollers may separate;
   means to mount said second roller on said second arms at trailing ends of the second arms in position adjacent to, generally above and substantially parallel to the first roller the second arms permitting the second roller to pivot upwardly relative to the first roller;
   means operable between the first and second arms to permit adjustably spacing the rollers relative to each other; and
   means to drive the rollers about their axes with the arms positioned to permit the first roller to be contiguous to the ground and the second roller spaced above the ground, said first and second rollers being positioned with their axis oblique to the direction of travel whereby rocks and the like engaged by the rollers are moved along the rollers and discharged at one end of the rollers;
   said rollers being of construction and rotated in the same direction so that the lower edge portion of both rollers tends to impel the rocks in opposite direction to the direction of movement, the peripheries of said rollers being completely spaced from each other during use but preventing materials to be windrowed from passing between the rollers.

2. The combination as specified in claim 1 and means to adjust the spacing of the first roller are relative to the ground.

3. The combination as specified in claim 1 wherein said frame is adapted to be pulled by a wheeled prime mover, and cultivator means positioned on said location to engage the ground in the path of travel of the wheels of said prime mover.

4. The combination of claim 1 wherein the first and second arms at the ends of the rollers where the rock windrow is discharged are formed with offset portions at their forward ends to increase ground clearance of the arms adjacent the rollers.

* * * * *

UNITED STATES PATENT OFFICE
CERTIFICATE OF CORRECTION

Patent No. 4,315,546　　　　　　　　　　Dated February 16, 1982

Inventor(s) Harley D. Fahrenholz

It is certified that error appears in the above-identified patent and that said Letters Patent are hereby corrected as shown below:

Column 8, line 34, Claim 2, line 2, cancel "are"; Column 8, line 38, Claim 3, line 3, cancel "location" and insert --frame--.

Signed and Sealed this

Eighth Day of June 1982

|SEAL|

Attest:

Attesting Officer

GERALD J. MOSSINGHOFF
Commissioner of Patents and Trademarks